United States Patent
Roser

(10) Patent No.: US 6,675,126 B2
(45) Date of Patent: Jan. 6, 2004

(54) METHOD, COMPUTER PROGRAM, AND STORAGE MEDIUM FOR ESTIMATING RANDOMNESS OF FUNCTION OF REPRESENTATIVE VALUE OF RANDOM VARIABLE BY THE USE OF GRADIENT OF SAME FUNCTION

(75) Inventor: Christoph Hermann Roser, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 329 days.

(21) Appl. No.: 09/817,226

(22) Filed: Mar. 27, 2001

(65) Prior Publication Data

US 2002/0143495 A1 Oct. 3, 2002

(51) Int. Cl.[7] ............................................. G06F 101/14
(52) U.S. Cl. ........................... 702/179; 706/13; 704/236
(58) Field of Search ................................. 702/179, 181, 702/182, 183, FOR 139; 706/13, 20, 27; 704/236, 239, 240, 255

(56) References Cited

U.S. PATENT DOCUMENTS 5,465,321 A * 11/1995 Smyth ........................ 706/20
5,619,537 A * 4/1997 Altes ......................... 375/322
6,115,700 A * 9/2000 Ferkinhoff et al. ............ 706/13
6,324,532 B1 * 11/2001 Spence et al. ................ 706/27
6,539,351 B1 * 3/2003 Chen et al. .................. 704/236

* cited by examiner

Primary Examiner—Marc S. Hoff
Assistant Examiner—Mohamed Charioui
(74) Attorney, Agent, or Firm—Oblon, Spivak, McClelland, Maier & Neustadt, P.C.

(57) ABSTRACT

A method of estimating a measure of randomness of a function of at least one representative value of at least one random variable is constructed to have the steps of obtaining the at least one random variable; determining the at least one representative value of the obtained at least one random variable; determining a first statistic of the obtained at least one random variable; determining a gradient of the function with respect to the determined at least one representative value; and transforming the obtained first statistic into a second statistic of the function, using the determined gradient. The step of transforming may be adapted to transform the first statistic into the second statistic, such that the second statistic responds to the first statistic more sensitively in the case of the gradient being steep than in the case of the gradient being gentle.

29 Claims, 14 Drawing Sheets

$$X = \{x_1, x_2, ..., x_i, ..., x_n\} \quad \cdots (1)$$

FIG.4A

$$Z = f(E[X], E[Y], ...) \quad \cdots (2)$$

FIG.4B

$$W = g(E[X]) = \frac{1}{E[X]} \quad \cdots (3)$$

FIG.4C

$$P = h(E[X], E[Y]) = \frac{E[Y]}{E[X]} \quad \cdots (4)$$

FIG.4D

$$E[X] = \frac{\sum_{i=1}^{n} x_i}{n} \quad \cdots (5)$$

FIG.4E

$$S[X] = \sqrt{\frac{\sum_{i=1}^{n}(x_i - E[X])^2}{n-1}} \quad \cdots (6)$$

FIG.4F

$$S_{ML}[X] = \sqrt{\frac{\sum_{i=1}^{n}(x_i - E[X])^2}{n}} \quad \cdots (7)$$

FIG.4G

$$\text{Cov}[X,Y] = \frac{1}{n-1}\left(\sum_{i=1}^{n} x_i \cdot y_i - \frac{\sum_{i=1}^{n} x_i \cdot \sum_{i=1}^{n} y_i}{n}\right) \quad \cdots (8)$$

FIG.8A

$$\text{Cov}_{ML}[X,Y] = \frac{\sum_{i=1}^{n} x_i \cdot y_i}{n} - \frac{\sum_{i=1}^{n} x_i \cdot \sum_{i=1}^{n} y_i}{n^2} \quad \cdots (9)$$

FIG.8B

$$\text{Corr}[X,Y] = \frac{\text{Cov}[X,Y]}{S[X] \cdot S[Y]} \quad \cdots (10)$$

FIG.8C

$$\frac{dg}{dE[X]} = \frac{-1}{E[X]^2} \quad \cdots (11)$$

FIG.8D

$$\frac{dh}{dE[X]} = \frac{-E[Y]}{E[X]^2} \quad \cdots (12)$$

FIG.8E

$$\frac{dh}{dE[Y]} = \frac{1}{E[X]} \quad \cdots (13)$$

FIG.8F

$$S[Z] = \sqrt{\left(\frac{df}{dE[X]} \cdot S[X]\right)^2} \qquad \cdots (14)$$

FIG.9A $$S[Z]^2 = \left(\frac{df}{dE[X]} \cdot S[X]\right)^2$$
$$+ \left(2 \cdot \frac{df}{dE[X]} \cdot \frac{df}{dE[Y]} \cdot C_{ov}[X,Y]\right)$$
$$+ \left(\frac{df}{dE[Y]} \cdot S[Y]\right)^2 \qquad \cdots (15)$$

FIG.9B $$S_{mean}[Z] = \frac{S[Z]}{\sqrt{n}} \qquad \cdots (16)$$

FIG.9C $$CI[Z] = z_{n-1,(1-a)/2} \cdot \frac{S[Z]}{\sqrt{n}} \qquad \cdots (17)$$

FIG.10A $$CI[Z] = \sqrt{\left(\frac{df}{dE[X]} \cdot CI[X]\right)^2} \qquad \cdots (18)$$

FIG.10B $$CI[Z]^2 = \left(\frac{df}{dE[X]} \cdot CI[X]\right)^2$$
$$+ \left(2 \cdot \frac{df}{dE[X]} \cdot \frac{df}{dE[Y]} \cdot CI[X] \cdot CI[Y] \cdot C_{orr}[X,Y]\right)$$
$$+ \left(\frac{df}{dE[Y]} \cdot CI[Y]\right)^2 \qquad \cdots (19)$$

FIG.10C $$\{E[Z] - CI[Z], E[Z] + CI[Z]\} \qquad \cdots (20)$$

FIG.10D $$f' = \frac{df}{dE[X]} \cdot (X-E[X]) + f(E[X]) \qquad \cdots (21)$$

FIG.13A

$$f' = \frac{df}{dE[X]} \cdot (X-E[X])$$
$$+ \frac{df}{dE[Y]} \cdot (Y-E[Y])$$
$$+ f(E[X], E[Y]) \qquad \cdots (22)$$

FIG.13B

$$Z' = f'(x,y) \qquad \cdots (23)$$

FIG.13C

METHOD, COMPUTER PROGRAM, AND STORAGE MEDIUM FOR ESTIMATING RANDOMNESS OF FUNCTION OF REPRESENTATIVE VALUE OF RANDOM VARIABLE BY THE USE OF GRADIENT OF SAME FUNCTION

CROSS-REFERENCE TO RELATED APPLICATIONS

Not Applicable.

BACKGROUND OF THE INVENTION

1. Field of the Invention

The present invention relates to a statistical analysis of data, specifically to a technology for estimating a measure of randomness of a function of at least one random variable.

2. Discussion of the Related Art

Frequently, there are performance measures of systems, which are based on the means of random variables. For example, a percentage of time of machine under repair is a function of the mean repair time divided by the mean time between the beginning of repairs. It is important to distinguish between the mean of a function of at least one random variable and the function of the means of at least one random variable. In the case of the machine repair, it would be possible to divide the individual repair times by the individual times between the beginning of repairs, and to obtain the mean of this ratio. However, this mean of the function would differ from the function of the means. Only the function of the means represents the correct percentage of the machine under repair.

Frequently, the means of the random variables are not known exactly, but rather are based on a set of collected data. Therefore, these means may differ from the true means. Subsequently, the function of the means may differ from the function of the true means. Frequently, there is interest in a measurement of the accuracy of the function of the means. This measurement of accuracy is usually expressed as a confidence interval around the mean or median, but may also be expressed as a variance, a standard deviation, or a quantile. While the calculation of such measures is well known in statistical analysis for individual random variables, it is more difficult for functions of the means.

Common uses of the function of at least one mean are frequencies of occurrences, where the mean frequency is the inverse of the mean time between occurrences. Another common uses are percentages of times, where the mean percentage is the mean duration divided by the mean time between the start of duration's cycles.

One conventional method to calculate the confidence interval of the function of means is called batching, also known as non-overlapping batch means method. In this method, the sufficiently large sets of data are split into a number of subsets. The means for each subset is calculated and subsequently the function of the means is calculated for each subset. A confidence interval can be constructed on the different values of the function of means.

However, this conventional method is suitable only for sufficiently large sets of data in order to satisfy the central limit theorem. This method can therefore not be used on small data sets. In addition, the confidence interval for a set of data can vary significantly with the number of subsets used. The selection of an unsuitable number of subsets may cause incorrect results. Furthermore, this method requires significant storage capacity and computational power as the size of the data set increases. Finally, due to the nature of the computation, these intensive calculations have to be repeated every time additional data becomes available.

Many approaches have been developed to assist the selection of the number of subsets for the above batching method. However, they are usually very complicated and require a high level of expertise. In addition, the results of these approaches may differ from one another. Furthermore, the computational requirements increased ever further as these approaches frequently require a significant statistical effort to analyze the subsets and the relation therebetween.

A variant of the above conventional batching method, known as overlapping batch means method, creates overlapping subsets. While this variant may have a slight improvement over the basic batching method, it still requires a large data set, the selection of a number of subsets, significant storage and computational capacity. Furthermore, the complexity of the variant is still significant and requires significant statistical knowledge.

BRIEF SUMMARY OF THE INVENTION

It is therefore an object of the present invention to permit the estimation of a measure of randomness of a function of at least one representative value of at least one random variable, even for a relatively small size of data set to be used, in a reduced time.

The object may be achieved according to any one of the following modes of this invention. Each of these modes of the invention is numbered like the appended claims, and depends from the other mode or modes, where appropriate. This type of explanation about the present invention is for better understanding of some instances of a plurality of technical features and a plurality of combinations thereof disclosed in this specification, and does not mean that the plurality of technical features and the plurality of combinations in this specification are interpreted to encompass only the following modes of this invention:

(1) A method of estimating a measure of randomness of a function of at least one representative value of at least one random variable, comprising:

a step of obtaining the at least one random variable;

a step of determining the at least one representative value of the obtained at least one random variable;

a step of determining a statistic of the obtained at least one random variable;

a step of determining a gradient of the function with respect to the determined at least one representative value; and a step of transforming the obtained statistic of the at least one random variable into a statistic of the function, using the determined gradient.

As the result of the inventor's research, he has found that there exists a statistical characteristic that, while a statistic of a function of a random variable, which statistic may include a measure of randomness or dispersion, strongly tends to reflect a statistic of the random variable, which statistic may include the measure of randomness or dispersion, such that the statistic of the random variable is enlarged in the case of a steep gradient of the function of the random variable, the statistic of the function strongly tends to reflect a statistic of the random variable such that the statistic of the random variable is reduced in the case of a gentle gradient of the function of the random variable In addition, the above research also revealed that, the utilization of the characteristic mentioned above would permit the estimation of a measure of randomness of a function of a representative value of a random variable, ensuring an accuracy thereof almost equal to one established in the use of the conventional batching method aforementioned, with a smaller size of data used than in the batching method, in a shorter time required than in the batching method.

On the basis of the above findings, in the above mode (1) of the present invention, at least one representative value of at least one random variable is determined and a statistic of the at least one random variable is determined. Furthermore, in the mode (1), a gradient of a function of the at least one random variable with respect to the determined at least one representative value is determined, and, by the use of the determined gradient, the determined statistic of the at least one random variable is transformed into a statistic of the function.

Hence, the mode (1) would permit the estimation of a measure of randomness of a function of at least one representative value, by the use of a smaller size of data used than in the conventional batching method, in a shorter time required than in the batching method.

The term "representative value" may be defined, in the above mode (1) and other modes of the present invention, to mean a measure of central tendency of a distribution of a plurality of individual data values belonging to the at least one random variable or the function, for instance.

Further, in the case of a plurality of random variables or a plurality of functions, the term "representative value" may be defined, in the above mode (1) and other modes of the present invention, to mean a plurality of representative values for the plurality of random variables or functions, respectively, for instance.

In addition, the step of determining a gradient may be constituted to exactly or approximately determine the gradient. For example, the step of determining a gradient may be adapted to determine a gradient of the function exactly at the at least one representative value, and may be adapted to determine a gradient of the function in the vicinity of the at least one representative value.

Furthermore, the term "function" is interpreted, in the above mode (1) and other modes of the present invention, as an operator for associating the at least one random variable with at least one other variable, one example of which may be a performance function described below, which function associates the at least one random variable with a performance measure.

(2) The method according to the above mode (1), wherein the step of transforming comprises transforming the statistic of the at least one random variable into the statistic of the function, such that the statistic of the function responds to the statistic of the at least one random variable more sensitively in the case of the gradient being steep than in the case of the gradient being gentle.

In the above mode (2), in light of the statistical characteristic aforementioned, which has been recognized by the inventor, a statistic of at least one random variable is transformed into a statistic of a function, such that the statistic of the function responds to the statistic of the at least one random variable more sensitively in the case of the gradient being steep than in the case of the gradient being gentle. (3) The method according to the above mode (1) or (2), wherein each one of the at least one representative value of the at least one random variable comprises at least one of an average, an arithmetic mean, a geometric mean, a median, a harmonic mean, and a mode, of each one of the at least one random variable.

(4) The method according to any one of the above modes (1) to (3), wherein the step of determining the at least one representative value comprises determining the at least one representative value of the at least one random variable, upon truncating at least one part of individual data values belonging to the at least one random variable.

In the above mode (4), the at least one representative value is determined with the removal of abnormal data out of the plurality of individual data values by the application of truncation to the original individual data values, resulting in the improvement in an accuracy of determining the at least one representative value, followed by the improvement in an accuracy of estimating the randomness of the function of the at least one random variable.

(5) The method according to any one of the above modes (1) to (4), wherein the statistic of each one of the at least one random variable comprises at least one of a standard deviation, a confidence interval, a set of data, a probability density function, and a cumulative density function, of the each random variable.

(6) The method according to any one of the above modes (1) to (5), wherein the statistic of the function comprises at least one of a standard deviation, a confidence interval, a set of data, a probability density function, and a cumulative density function, of the function.

(7) The method according to any one of the above modes (1) to (6), further comprising a step of estimating the measure of randomness of the function of the at least one representative value, on the basis of the statistic of the function.

(8) The method according to the above mode (7), wherein the measure of randomness comprises a range of a confidence interval of the function of the at least one representative value.

(9) The method according to the above mode (7) or (8), applied to a simulation for discrete event, results of which simulation is used to effect the method, wherein the step of estimating comprises estimating the measure of randomness using results of only one execution of the simulation.

The above mode (9) would permit the estimation of the randomness of the function of the at least one random variable in a shorter time than estimated by the conventional batching method aforementioned.

Furthermore, this mode (9) would allow the reduction in time length required for the randomness estimation described above for one simulation, and as a result, this mode (9) would facilitate to perform the randomness estimation for other simulation within a given time.

Consequently, in the case where a plurality of simulations for a system to be investigated on its performance is required for the above randomness estimation, this mode (9) would permit the randomness estimation for those plurality of simulations in a shorter time than the conventional batching method mentioned before.

Thus, this mode (9) would also facilitate to compare the estimated measures of randomness for those plurality of simulations within a reduced time, facilitating an optimization of the system to be investigated using simulations, within a shorter time, at an improved accuracy.

(10) The method according to the above mode (9), wherein an accuracy to be satisfied with the statistic of the function is predetermined, and the step of determining a statistic comprises:

(a) determining the statistic of the at least one random variable, on the basis of a sum of individual data values belonging to the at least one random variable;

(b) determining the statistic of the at least one random variable on the basis of the sum, upon adding to the sum at least one new individual data value belonging to the at least one random variable;

(c) determining the statistic of the at least one random variable when at least one new individual data value belonging to the at least one random variable becomes available during the simulation;

(d) transforming the determined statistic of the at least one random variable into the statistic of the function; and (e) terminating the simulation when the predetermined accuracy is satisfied with the statistic of the function.

The above mode (10) would facilitate to monitor the increase in an accuracy of the statistic of the function of the at least one random variable as the simulation progresses.

In addition, this mode (10) would facilitate to automatically terminate the simulation when the predetermined accuracy of the statistic of the function of the at least one random variable is reached.

(11) The method according to any one of the above modes (1) to (10), wherein the function is a function of a plurality of random variables, the step of transforming comprising:

(a) determining a measure of randomness of each one of the random variables at or in the vicinity of a representative value of each one of the obtained plurality of random variables, as the statistic of each random variable;

(b) determining a measure of dependence between the plurality of random variables; and (c) transforming the determined measures of randomness of the plurality of random variables into a measure of randomness of the function, using the determined measure of dependence and the determined gradient.

In the above mode (11), in the case of a plurality of random variables, the randomness of the function of the plurality of random variables is estimated by taking account of a measure of dependence between those random variables.

Subsequently, this mode (11) would allow, in the case of a plurality of random variables, the accurate estimation of the randomness of the function of those random variables.

(12) The method according to the above mode (11), wherein the measure of randomness of the each random variable comprises at least one of a maximum likelihood estimator of a variance of the each random variable, an unbiased estimator of the variance, a maximum likelihood estimator of a standard deviation of the each random variable, an unbiased estimator of the standard deviation, a variance of a representative value of the each random variable, a standard deviation of a representative value of the each random variable, a coefficient of variation of the each random variable, a general central moment of the each random variable, a confidence interval of the each random variable, a set of data indicative of the each random variable, a probability density function of the each random variable, and a cumulative density function of the each random variable.

(13) The method according to the above mode (11) or (12), wherein the measure of dependence comprises at least one of an unbiased estimator of a covariance of the plurality of random variables, a maximum likelihood estimator of the covariance, and a correlation coefficient of the plurality of random variables.

(14) The method according to any one of the above modes (1) to (13), wherein the function is a function of a plurality of random variables, the step of transforming comprises transforming the obtained statistic of the plurality of random variables into the statistic of the function, without a calculation of a measure of dependence between the plurality of random variables.

In the above mode (14), in the case of a plurality of random variables, a statistic obtained for those random variables is transformed into a statistic of the function, without a calculation of the dependence between those random variables.

Thus, this mode (14) would permit, in the case where the number of the at least one random variable is plural, and where the plurality of random variables are independent of each other or are dependent from each other at a negligible low level, the estimation of the randomness of the function of the random variables in a shorter time than when, upon the calculation of dependence between those random variables, the transformation between statistics is performed.

(15) A method of determining a set of data of a function of a representative value of each one of at least one random variable, which set of data allows an evaluation of a statistic of the function, comprising:

a step of obtaining a set of individual data values belonging to each random variable, which set represents an approximation of a distribution of the each random variable;

a step of determining the representative value of the each random variable;

a step of determining a gradient of the function with respect to the determined representative value; and a step of transforming the obtained set of individual data values into the set of data representing the function.

In the above mode (15), in light of the findings recognized by the inventor of the present invention, as described with relation to the above mode (1), a set of a plurality of individual data values belonging to the each random variable, which set represents an approximation of a distribution of the each random variable is obtained, and a representative value of the each random variable is determined. Furthermore, in this mode (15), a gradient of the function of the at least one random variable with respect to the determined representative value is determined, and by the use of the determined gradient, the obtained set of individual data values for the at least one random variable is transformed into a set of data representing the values of the function.

Consequently, this mode (15) would permit the estimation of a measure of randomness of a function of at least one random variable in the form of a set of data representing the randomness, according to basically the same principle as the one accepted in the above mode (1).

(16) The method according to the above mode (15), wherein the step of transforming the set of individual data values of the each random variable into the set of data representing the function, such that the set of data representing the function responds to the set of individual data values more sensitively in the case of the gradient being steep than in the case of the gradient being gentle.

(17) The method according to the above mode (15) or (16), further comprising a step of estimating a measure of randomness of the function of the representative value, on the basis of the set of data representing the function.

(18) The method according to the above mode (17), wherein the measure of randomness comprises a range of a confidence interval of the function of the representative value.

(19) The method according to the above mode (17) or (18), applied to a simulation for discrete event, results of which simulation is used to effect the method, wherein the step of estimating comprises estimating the measure of randomness using results of only one execution of the simulation.

The above mode (19) would provide basically the same operation and advantageous effects as the above mode (9) would.

(20) The method according to any one of the above modes (1) to (19), applied to an analysis of a plurality of business models to be accepted in realizing a given business, wherein a function of at least one of random variable is predetermined for each one of the plurality of business models, and the function of a representative value of the each random variable for one of the plurality of business models is to be compared with the function of a representative value of the each random variable for another of the plurality of business models.

The above mode (20) would allow the determination of an accuracy of the function of the at least one random variable, for each business model.

In addition, this mode (20) would permit the determination of the likelihood of one business model outperforming another business model.

(21) A method of estimating a measure of randomness of at least one random variable to satisfy a predetermined condition regarding a measure of randomness of a function of at least one representative value of the at least one random variable, the predetermined condition being formulated to define a central location and a measure of dispersion, of a distribution of the function, comprising:

a step of determining a gradient of the function with respect to the defined central location; and a step of determining the measure of randomness of the at least one random variable, on the basis of the determined gradient and the defined measure of dispersion.

As is apparent from the previous explanation regarding the above mode (1), it is possible to mutually associate a measure of randomness of at least one random variable, and a measure of randomness of a function of at least one representative value of the at least one random variable. This means that, the use of a gradient of the function would permit not only a forward estimation to estimate a measure of randomness of the function of the at least one representative value of the at least one random variable, from a measure of randomness of the at least one random variable, but also a backward estimation to estimate a measure of randomness of the at least one random variable, from a measure of randomness of the function of the at least one representative value of the at least one random variable.

In view of the above findings, in the above mode (21), a condition to be satisfied by a measure of randomness of a function of at least one representative value of at least one random variable is predetermined, where the predetermined condition defines a central location of a distribution of the function, and a measure of dispersion of the distribution. Furthermore, in this mode (21), a gradient of the function with respect to the defined central location is determined, on the basis of the determined gradient and the defined measure of dispersion, and a measure of randomness of the at least one random variable.

(22) The method according to the above mode (21), wherein the step of determining the measure comprises transforming the defined measure of dispersion into the measure of randomness of the at least one random variable, such that the measure of randomness of the at least one random variable responds to the defined measure of dispersion more sensitively in the case of the gradient being steep than in the case of the gradient being gentle.

In the above mode (22), by the use of a gradient of the function, according to a principle accompanied with necessary changes to one accepted in the above mode (2), the defined measure of dispersion of the function is transformed into a measure of randomness of the at least one random variable.

(23) The method according to the above mode (21) or (22), wherein the measure of dispersion comprises at least one of a standard deviation, a confidence interval, a set of data, a probability density function, and a cumulative density function, of the function.

(24) The method according to any one of the above modes (21) to (23), wherein the measure of randomness of each one of the at least one random variable comprises at least one of a standard deviation, a confidence interval, a set of data, a probability density function, and a cumulative density function, of the each random variable.

(25) A computer program to be executed by a computer to effect the method according to any one of the above modes (1) to (24).

When a computer program according to the above mode (25) is executed by a computer, the same advantageous effects would be provided, according to basically the same principle as one accepted in a method set forth in any one of the above modes (1) to (24).

The term "program" may be interpreted to include, not only a set of instructions to be executed by a computer so that the program may function, but also any files and data to be processed by the computer according to the set of instructions.

(26) A computer-readable storage medium having stored therein the computer program according to the above mode (25).

When the program having been stored in a computer-readable storage medium is executed by a computer, the same advantageous effects would be provided, according to basically the same principle as one accepted in a method set forth in any one of the above modes (1) to (24).

The term "storage medium" may be realized in different types, including a magnetic recording medium such as a floppy-disc, an optical recording medium such as a CD and a CD-ROM, an optical-magnetic recording medium such as an MO, an unremovable storage such as a ROM, for example.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIGS. 4A to 4G show equations (1) to (7), respectively, for explaining the above estimation program of FIG. 3;

FIGS. 8A to 8F show equations (8) to (13), respectively, for explaining the above estimation program of FIG. 3;

FIGS. 9A to 9C show equations (14) to (16), respectively, for explaining the above estimation program of FIG. 3;

FIGS. 10A to 10D show equations (17) to (20), respectively, for explaining the above estimation program of FIG. 3;

FIGS. 13A to 13C show equations (21) to (23), respectively, for explaining the above estimation program of FIG. 12.

DETAILED DESCRIPTION OF THE INVENTION

Several presently preferred embodiments of the invention will be described in detail by reference to the drawings in which like numerals are used to indicate like elements throughout.

[First Embodiment]

Figure 1:
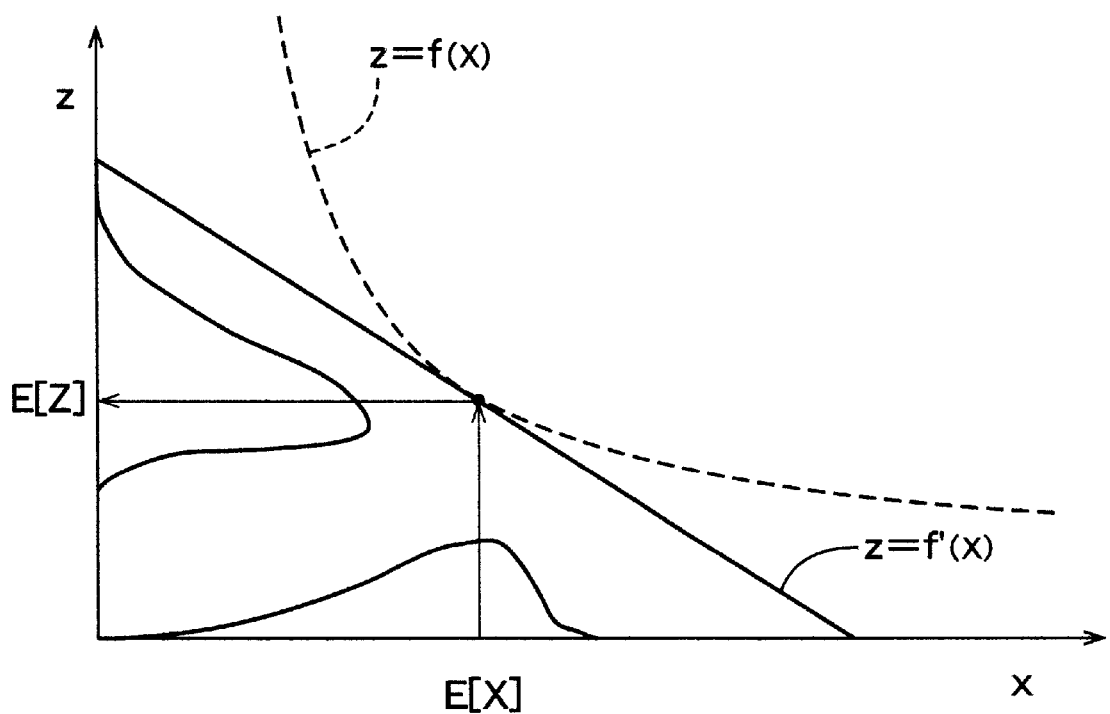
FIG. 1 is graphs for explaining a relationship between a random variable X, a performance measure Z, a performance function f, and a tangent function f', which relationship is established in a method of estimating a measure of randomness of a function of a random variable according to a first embodiment of the present invention.

Referring first to FIG. 1, there will be described a technological principle accepted in a first embodiment of the present invention in the form of a method of estimating a measure of randomness of a function of at least one random variable (hereinafter referred to simply as "randomness estimating method") by a graph thereon. In the first embodiment, a measure of randomness of a function of at least one representative value of at least one random variable is estimated using a gradient of the function, and thereby transforming a measure of randomness of the at least one random variable into a measure of randomness of the function of the at least one representative value of the at least one random variable.

Described in more detail, in the first embodiment, the representative value of each random variable is used in the form of a mean thereof, and the function of the mean is used in the form of a performance function which is a function of a mean time between occurrences and which is to derive a frequency of occurrence from the mean time between under the function. In FIG. 1, a two-dimensional coordinate system is shown with a random variable x being taken along the horizontal axis, and with a performance measure z of a system to be investigated by a simulation, being taken along the vertical axis. In the coordinate system, the performance function in the form of $z=f(X)$ is shown by a broken line, while a tangent function in the form of $z=f'(X)$ representing a tangent (i.e., a tangent line or plane) of the performance function is shown by a solid line.

Figure 2:
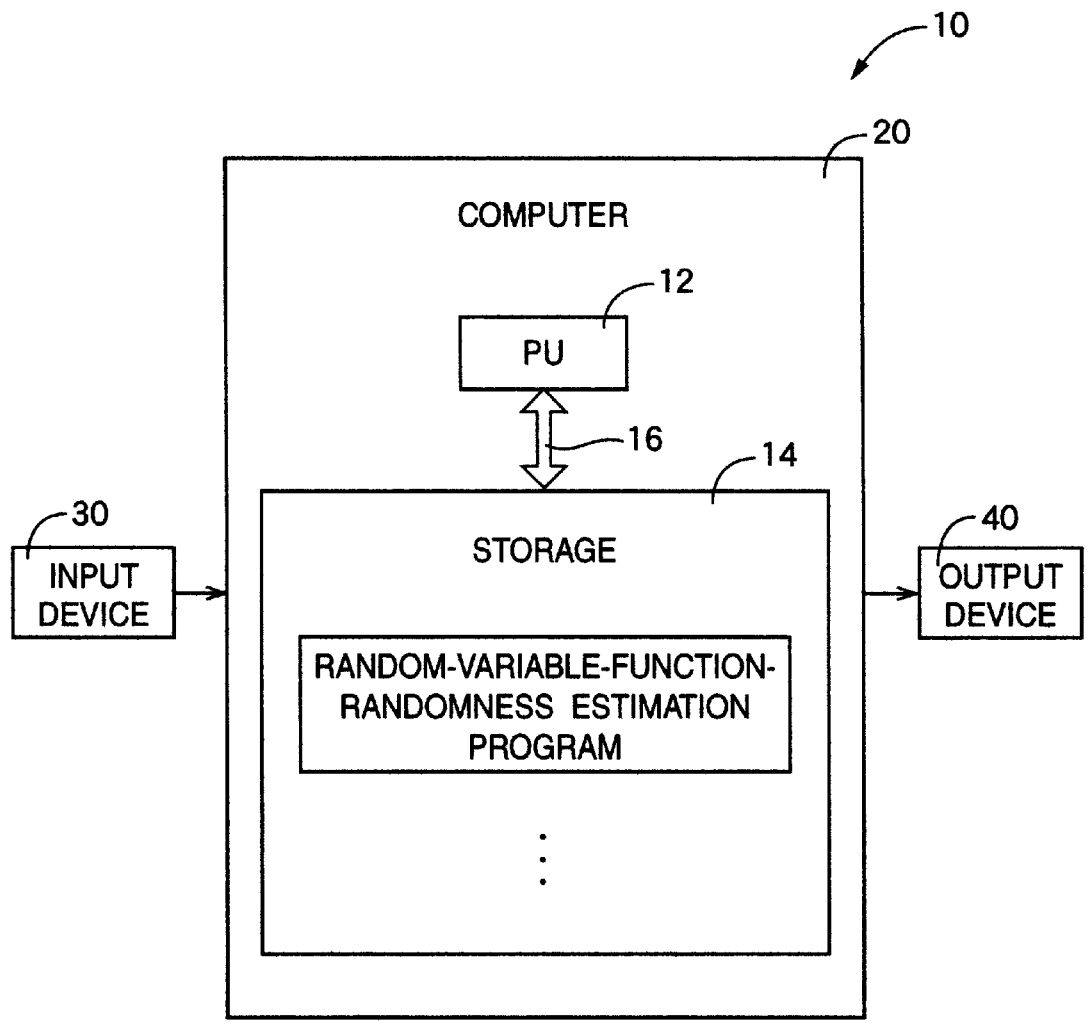
FIG. 2 is a block diagram schematically illustrating a hardware arrangement of a computer system used by a user thereof for effecting the above method of FIG. 1.

Referring next to FIG. 2, where is schematically illustrated by a block diagram a hardware arrangement of a computer system 10 to be used by a user to effect the aforementioned randomness estimating method according to the first embodiment.

The computer system 10 is constructed, as well known to those skilled in the art, to have a computer 20 so configured that a processing unit (referred to as "PU" in the drawings and the description) 12 and a storage 14 are connected with each other with a bus 16. The computer 20 is connected with an input device 30 equipped with a pointing device in the form of a mouse and a keyboard, and an output device 40 displaying an image on a screen thereof The storage 14 is constructed to contain a recording medium such as a ROM, a RAM, a magnetic disc, an optical disc, etc. The user of the computer system 10 inputs data to be required, into the computer 20 through the input device 30. In response to the input operation, results of data processing performed by the computer 20 are visualized to present before the user by means of the output device 40.

The storage 14 has already stored therein a random-variable-function estimation program (referred to as "estimation program") to be executed by the PU 12 in order to effect the randomness estimation method according to the first embodiment of the present invention. The storage 14 is designed to store therein data to be used during the execution of the estimation program by the PU 12, where appropriate.

Figure 3:
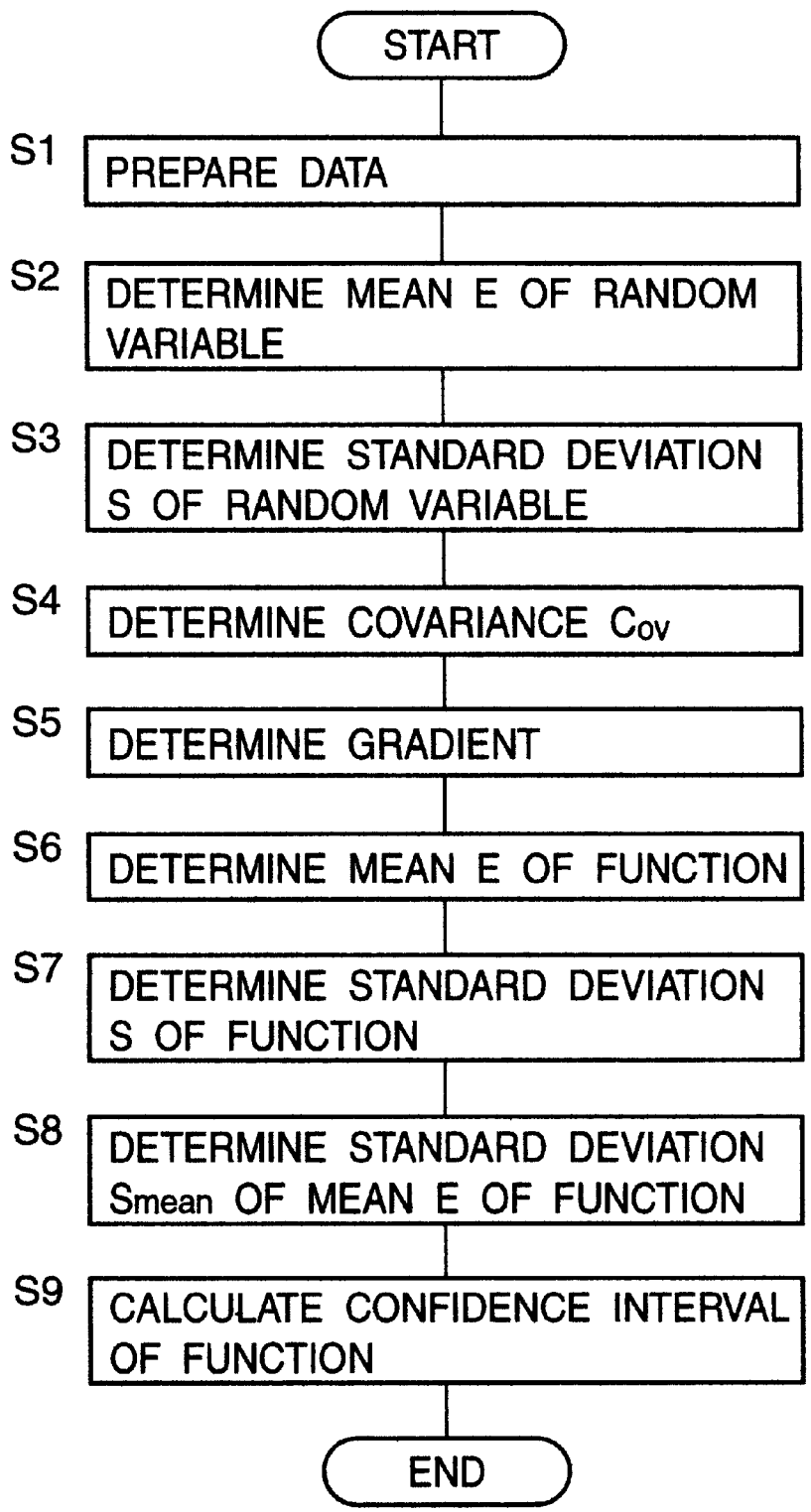
FIG. 3 is a flow chart schematically illustrating a random-variable-function-randomness estimation program executed by a computer 20 of FIG. 2 to effect the above method of FIG. 1.

Referring next to FIG. 3, there is schematically illustrated by a flow chart the estimation program mentioned above. While this program will be described below in reference to the flow chart, definitions of several symbols used in the estimation program will be first explained.

X: random variable as constructed by a set of individual data values $x_i$ $x_i$: each one of the individual data values belonging to random variable X Y: random variable as constructed by a set of individual data values $y_i$ $y_i$: each one of the individual data values belonging to random variable Y i: numeral of each individual data value n: set size, namely, the number of individual data values in each set thereof Z: performance measure of a system to be investigated by a simulation a: confidence level $Z_{n-1},(1-a)/2$: chi-square distribution $(1-a)/2$ quantile for set size n E[X]: mean (or expected value) of random variable X E[Y]: mean (or expected value) of random variable Y E[Z]: mean (or expected value) of performance function or performance measure S[X]: standard deviation of random variable X S[Y]: standard deviation of random variable Y S[Z]: standard deviation of performance function f(E[X]): general function of mean (or expected value) of random variable X f(E[X],E[Y], . . . ): general function of means (or expected values) of random variables X, Y, . . .

CI[X]: confidence interval half width of random variable X

Cov[X, Y]: covariance of random variables X, Y

Corr[X, Y]: correlation coefficient of random variables X, Y

Figure 5:
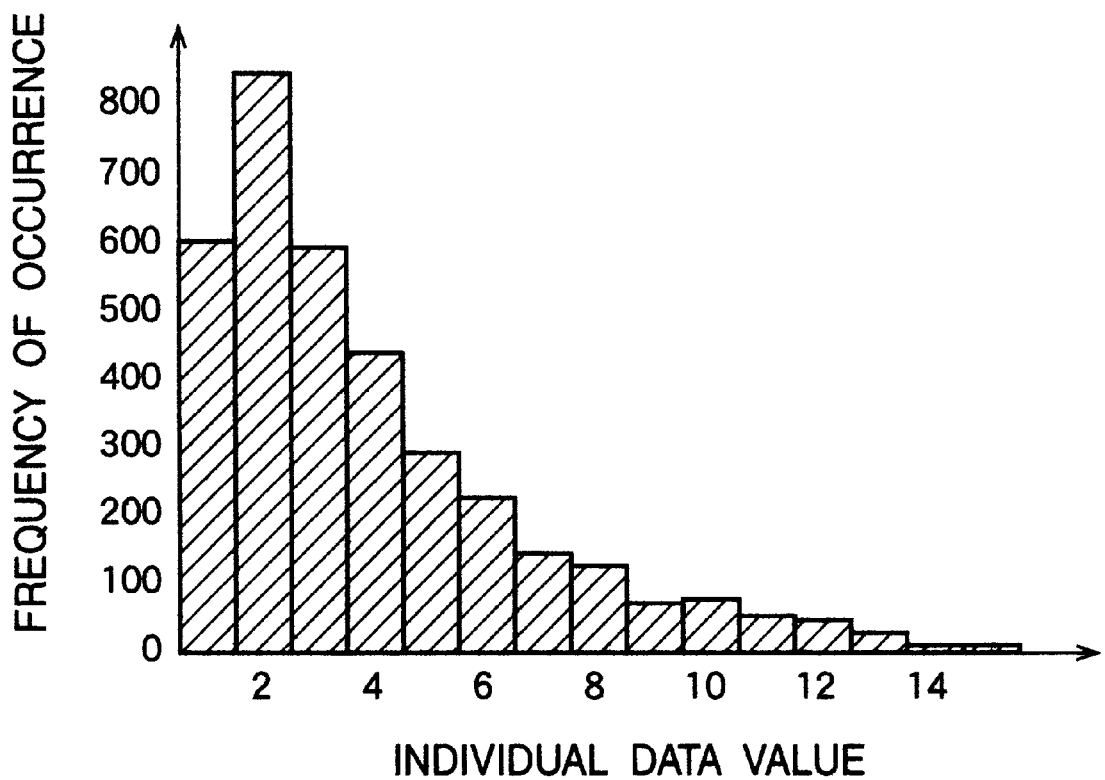
FIG. 5 is a histogram illustrating a frequency distribution of a random variable in the above method of FIG. 1.

W: frequency of occurrence
P: duration divided by time between start of durations' cycles
E[W]: mean (or expected value) of frequency W as a function of the mean of random variable X
E[P]: mean (or expected value) of percentage P as a function of the means of random variables X and Y The randomness estimating method according to the first embodiment of the present invention requires at least one random variable, in which a plurality of individual data values thereof are randomly distributed. Equation (1) of FIG. 4A represents, by way of an example where the random variable is X, that the random variable X is constructed to form a set of individual data values $x_i$. FIG. 5 shows a histogram of an example of a set of individual data values in a random log-normal distribution manner, for the better understanding of a relationship (i.e., a frequency distribution) between a random variable and a frequency thereof.

The randomness estimating method according to the first embodiment also requires a performance function of the means of at least one random variable. Equation (2) of FIG. 4B shows such a performance function as a general function f, where a performance measure Z is a function of random variables X, Y, . . . A frequently used embodiment of the performance measure is for example a frequency of occurrence, where the frequency W is a function of the mean E[X] of a randomly distributed time X between occurrences as shown by equation (3) in FIG. 4C. Another frequently used embodiment of the performance measure is for example a percentage, where the percentage P is a function of the mean E[X] of a randomly distributed time X between occurrences, and the mean E[Y] of a randomly distributed duration Y of the occurrences as shown by equation (4) of FIG. 4D.

Figure 6:
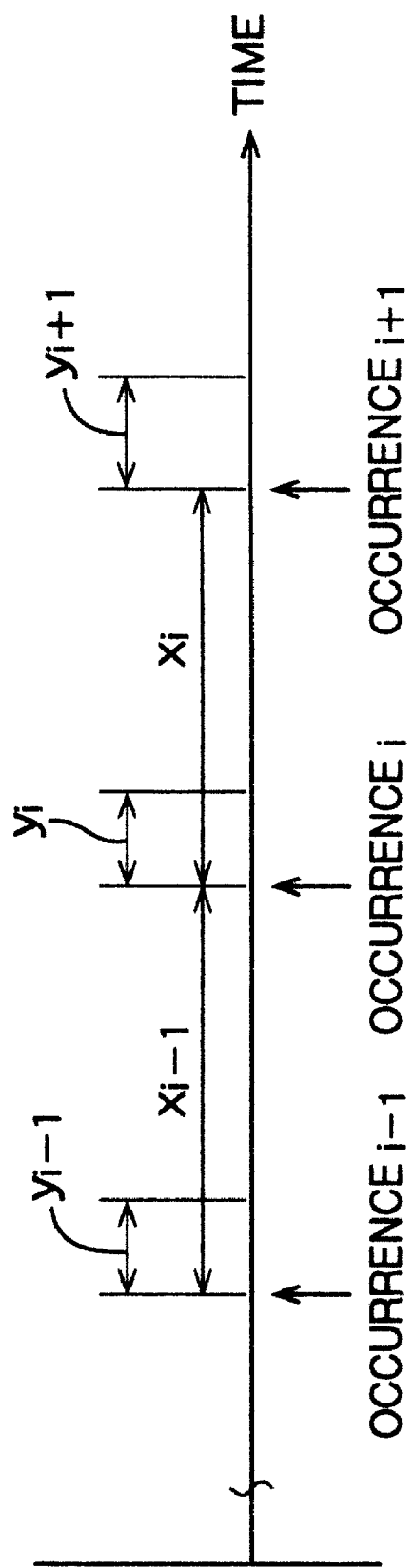
FIG. 6 is a graph schematically illustrating an event to which the above method of FIG. 1 is applied.

Referring next to FIG. 6, there are schematically illustrated by way of example several individual data values $x_i$ belonging to time between occurrences X, which serves as a first random variable, and several individual data values $y_i$ belonging to duration of occurrences Y, which serves as a second random variable.

The randomness estimation program will be described by referring to the flow chart of FIG. 3.

This program is initiated with step S1 where information regarding a random variables, which is to say, a set of data representing individual data values $x_i$, $y_i$ of the random variables is prepared.

Figure 7:
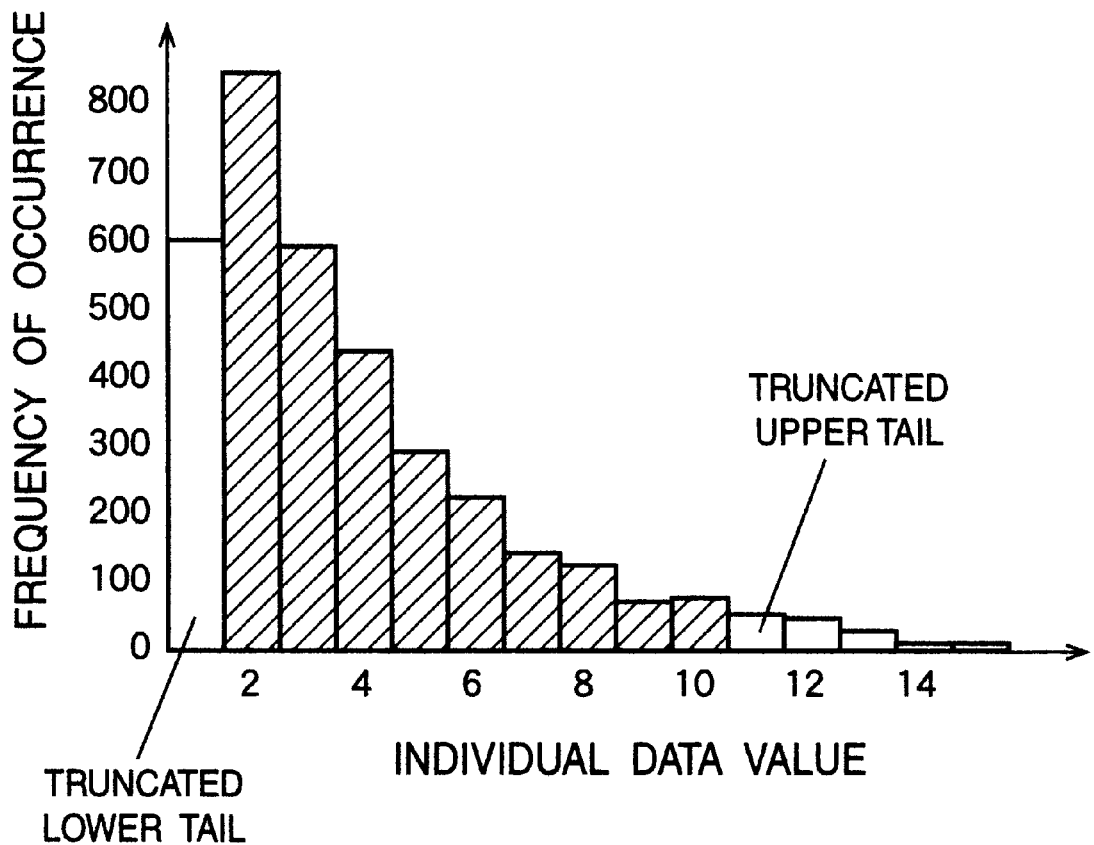
FIG. 7 is a histogram illustrating a frequency distribution of a random variable in the above method of FIG. 1, which random variable has been truncated.

It is to be added that, if necessary, the data set of the random variables may be truncated by removing a percentage of the smallest and/or largest individual data values. This is schematically shown in FIG. 7, where an unequal part of the smallest and the largest individual data values of the example in FIG. 5 has been removed.

It is to be also added that, for example, a set of data of the random variables may be removed during a warming up period (i.e., considered as a transition period of the aforementioned system in operation).

Step S1 described above is followed by step S2 to calculate a sum of all individual data values $x_i$, $y_i$ belonging to each random variable.

Then, in step S2, the calculated sum is divided by the number n of the individual data values $x_i$, $y_i$, to thereby determine the arithmetic mean of all the individual data values as the mean E[X], E[Y].

Subsequently, step S3 is implemented to determine a standard deviation S[X] of all the individual data values belonging to random variable X, and a standard deviation S[Y] of all the individual data values belonging to random variable Y. There are different estimators of a standard deviation, for example, an unbiased estimator of the standard deviation, or a maximum likelihood estimator of the standard deviation. While the unbiased estimator of the standard deviation is preferred, either estimator can be used. Similar is true for a variance, which, by definition, is merely a square of a standard deviation. For independent and identically distributed data, the unbiased estimator of the standard deviation S[X] can be calculated as shown by equation (6) in FIG. 4F. The maximum likelihood estimator SML[X] can be calculated as shown by equation (7) in FIG. 4G.

Then, in step S4, a variable analysis is performed to determine a measure of dependence between the random variables, in the case of a plurality of random variables. If the random variables are independent, no measure of dependence therebetween is needed. However, if the random variables are not independent, a measure of dependence therebetween is necessary. A covariance thereof is used as a measure of dependence therebetween. A biased estimator of the covariance of two random variables is calculated as shown by equation (8) in FIG. 8A.

It is to be added that, in step S4, instead of the unbiased estimator of the covariance Cov[X, Y], a maximum likelihood estimator of the covariance $COV_{ML}[X, Y]$ can be used, as shown by equation (9) in FIG. 8B. The difference therebetween is small, and either estimator can be used in the randomness estimating method according to the first embodiment of the present invention.

It is to be also added that, in step S4, alternatively, a correlation coefficient Corr[X, Y] can be substituted for the covariance Cov[X, Y] as shown by equation (10) in FIG. 8C.

Step S4 described above is followed by step S5 to determine a gradient or a slope of the performance function mentioned above of the means of all the individual data values for all the random variables X, Y, at the mean values E[X], E[Y]. These gradients can be visualized as tangents at the points of the mean values. The example is shown in FIG. 1, where a frequency performance function (indicated by a broken line) is plotted with the tangent (indicated by a solid line) at the mean time between occurrences E[X]. FIG. 1 further shows a frequency distribution of the random variable X by a solid line convex upward, a frequency distribution of the performance measure Z by a solid line convex rightward, respectively.

The slope for one random variable is determined by differentiating the performance function with respect to this random variable. This has to be done for all the random variables, giving one slope for each random variable.

It is to be added that equation (3) in FIG. 4C shows, as one example, a performance function g for a frequency W, while equation (11) in FIG. 8D shows a differential of the performance function g with respect to the single random variable X. Equation (4) in FIG. 4D shows, as another example, a performance function h for a percentage P, where the percentage P is calculated on the basis of two random variables X, Y. Two differentials of the performance function h are shown by equations (12) and (13) in FIGS. 8E, 8F, respectively.

However, it is not essential in using the present invention to exactly determine the gradient of the performance function so as to be equal to the gradient of the performance function exactly at the mean value. The present invention may be used to approximately determine the gradient of the performance function so as to be equal to the gradient of the performance function at one of the plurality of individual data values close to the mean thereof. Any approach to determine the gradient would not limit the scope of the present invention.

Step S5 previously described is followed by step S6 to determine the mean value E[Z] of the performance function. This can be done easily by applying the corresponding performance function g, h to the mean E[X], E[Y] of the corresponding random variable, as shown for an example of the frequency W by equation (3) in FIG. 4C, and for an example of the percentage P by equation (4) in FIG. 4D.

Step S7 is subsequently executed to translate or transform the standard deviation S[X], S[Y] of the random variables X, Y as calculated in step S3 into the standard deviation S[Z] of the performance function, using the gradient determined in step S5.

For one random variable, this can be done easily as shown by equation (14) in FIG. 9A. Equation (14) indicates that an operation to multiply the standard deviation S[X] by the differential df/dE[X] permits the standard deviation S[X] to be translated into the standard deviation S[Z] of the performance measure Z. It is to be noted that the square root of the square ensures a positive standard deviation.

For two random variables, equation (15) shown in FIG. 9B can be used. Equation (15) indicates that an operation to multiply the standard deviation S[X] by the differential df/dE[X], an operation to multiply the standard deviation S[Y] by the differential df/dE[Y], and an operation to multiply the covariance Cov[X, Y] by the differentials df/dE[X] and df/dE[Y] corporate to permit two standard deviations S[X] and S[Y] to be translated into one standard deviation S[Z] of the performance measure Z. Equation (15) has a term of the covariance, namely, Cov[X, Y], a value of which is used as one calculated in step S4.

It is to be noted that if those random variables are independent, the covariance Cov[X, Y] is zero and the term can be dropped. However, irrespective of whether those random variables are independent or not, the present invention may be practiced such that the term of the covariance is neglected in equation (15).

For more than two random variables, more complex statistical methods of the random variables have to be used.

Summing up, not the performance function is used to reflect the standard deviation of the random variables on the standard deviation of the performance function, but instead the slope is used to reflect the standard deviation of the random variables on the standard deviation of the performance function.

Described more specifically, in the present embodiment, the standard deviation of the random variables is transformed into the standard deviation of the performance function according to a ratio responsive to the gradient of the performance function, by taking account of a statistical characteristic that, while a standard deviation of a random variable strongly tends to be transformed into a standard deviation of a performance function in an enlarged manner when a gradient of the performance function is steep, a standard deviation of a random variable strongly tends to be transformed into a standard deviation of a performance function in a reduced manner when a gradient of the performance function is gentle.

Step S7 is followed by step S8 to normalize the standard deviation of the performance measure of the performance function for the number n of the individual data values of the set thereof for the random variables. The current standard deviation S[Z] is a theoretical value of each individual data value. Subsequently, to obtain the standard deviation of the mean value of the performance function, the standard deviation of the performance function has to be divided by the square root of the number n of individual data values as shown by equation (16) in FIG. 9C, resulting in a normalized standard deviation $S_{mean}[Z]$. This value is automatically included in the calculation of a confidence interval in the next step S9.

Step S9 uses the mean E[Z] of the performance function determined in step S6, and the standard deviation of the performance function determined in step S8, in order to determine a confidence interval of the performance measure of the performance function. This confidence interval depends on the selected confidence level a, the size of the samples n (i.e., the set size), the standard deviation of the general performance function S[Z], and the mean of the general performance function E[Z]. A confidence interval half width CI[Z] is calculated as shown by equation (17) in FIG. 10A, where $Z_{n-1}, (1-a)/2$ is the (1−a)/2 Quantile of the chi-square distribution for n−1 elements. The confidence interval half width CI[Z] gives a confidence interval range as shown by equation (20) in FIG. 10D.

It is to be added that there are additional approaches to calculate a confidence interval, as for example the use of a student t distribution. Any approach to calculate a confidence interval would not limit the scope of the present invention.

Then, one cycle of execution of this program is terminated.

The present embodiment will be described more specifically, by referring to one example to which the present embodiment is practically applied, comparing with the aforementioned batching method serving as one of conventional methods for the same purposes.

The applied example of the present embodiment assumes the simulation of a manufacturing system. Within this sample, the failures of a certain machine are analyzed. To simplify the problem, the machine is supposed to be placed either in a state of repair following a failure, or in a state of being available. A simulation is performed to determine the performance of the simulated manufacturing system.

Within this simulation, the time between the occurrence of a failure x is recorded, creating a set of data of times between failures X. The time to repair a failure is also recorded, creating a set of data Y. It is to be noted that the repair time y is part of the time between failures x, as shown in FIG. 6.

A failure is a rare event, with a long average time between the occurrences of two failures. Subsequently, even after running the simulation for a long time, only a few failures occurred. For the selected long simulation time, a set of 16 independent and identically distributed individual data values for random variables X and Y were obtained after removing the warming up period. This relates to step S1 in the flow chart of FIG. 3.

A small set of individual data values fails to allow the use of the above-mentioned batching method. While it is possible to divide the 16 values into 4 batches of 4 values, the resulting batch means would be highly inaccurate. The standard deviation of the batch means would depend on only 4 batch means, and therefore the standard deviation would also be highly inaccurate. Subsequently, it would be necessary to run a longer simulation to permit the batch means method. Since the simulation to obtain 16 values was already very long, a longer simulation is undesirable.

However, the present embodiment previously described allows the calculation of a confidence interval without further effort.

In the present embodiment, an initial analysis by the above simulation of two random variables X and Y using equations (5) and (6) in FIGS. 4E, 4F and equations (8) and (10) in FIGS. 8A, 8C gives the following values for the arithmetic means E[X], E[Y], the unbiased standard deviations S[X], S[Y], the unbiased covariance Cov [X, Y], and the unbiased correlation coefficient Corr[X, Y]:

E[X]=109 min
E[Y]=15 min
S[X]=53 min
S[Y]=10 min
Cov[X, Y]=105 min
Corr[X, Y]=0.1981

The correlation coefficient Corr[X, Y] indicates a positive dependence of the random variables X and Y, that is, a relatively long time between failures is likely to be followed by a relatively long time to repair the machine. This relates to steps S2, S3, and S4 in the flow chart in FIG. 3.

In step S5, the gradient of the performance functions for X and Y is calculated. Based on the mean value of the time between failures X, a failure frequency W is calculated according to equation (3) in FIG. 4C. Also, a percentage P of the time during which the machine is under repair is calculated as a function of the means as shown as equation (4) in FIG. 4D. The derivatives of the performance functions are shown as equations (11), (12) and (13) in FIGS. 8D, 8E, 8F, respectively. The values of the derivatives at the mean are shown below:

dW/dE[X]=0.00008417
dP/dE[X]=0.001263
dP/dE[Y]=0.009174

In step S6, the mean values of the performance functions are determined. Accordingly, the value of the frequency W is 0.009174 failures per minute and the value of the percentage P is 13.76%.

In step S7, the standard deviations of the performance value of the performance functions are calculated according to equation (14) in FIG. 9A for the frequency W, equation (15) in FIG. 9B for the percentage P. Subsequently, the standard deviation of the frequency W is 0.004461 failures per minute and the standard deviation of the percentage P is 10.23%.

However, these standard deviations are with respect to the size n of the data set. Then, in step S8, the standard deviations of the means are calculated according to equation (16) in FIG. 9C for the normalization. Subsequently, the standard deviation of the mean of the frequency W is 0.001115 and the standard deviation of the mean of the percentage P is 2.557%.

Finally, in step S9, a confidence interval is constructed according to equation (17) in FIG. 10A. A confidence level a of 95% was selected. The confidence interval half width for the frequency W is 0.002377 and the confidence interval half width for the percentage P is 5.450%. This relates to a confidence interval of the frequency in failures per minute as shown below. This confidence interval is also given using a unit of the number of failures per eight hour shift.

0.004461∓0.002377 Failures/Minute
2.14∓1.14 Failures/Shift

Similarly, the confidence interval of the percentage P can be given as shown below:

10.2%∓5.45%

Therefore, the present embodiment allowed the calculation of a confidence interval for the set of data, even though a standard batching method cannot be used due to the small sample size. The resulting confidence interval can be used to decide if the information is accurate enough or if additional simulation is necessary to collect more data and to improve the accuracy of the results.

It will be understood from the above explanation that step S1 provides an example of the step of obtaining set forth in the above mode (1), step S2 provides an example of the step of determining the at least one representative value set forth in the same mode, step S3 provides an example of the step of determining a statistic set forth in the same mode, step S5 provides an example of the step of determining a gradient set forth in the same mode, and steps S4, S7, and S9 corporate to provide an example of the step of transforming set forth in the same mode.

[Second Embodiment]

There will next be described a method of estimating a measure of randomness of a function of at least one representative value of at least one random variable, constructed according to a second embodiment of this invention. However, since the second embodiment is similar to the first embodiment in a hardware construction for the estimation of the measure of randomness except a software construction for the estimation of the measure of randomness, especially a random-variable-function-randomness estimation program to be executed by a computer corresponding to the computer 20 in the first embodiment, only this program will be described in detail.

In the first embodiment, a standard deviation of at least one random variable is used to determine a measure of randomness of the at least one random variable. Described more specifically, a standard deviation as one type of statistic representing a measure of randomness of the at least one random variable, and afterward, the determined standard deviation is converted into a standard deviation as one type of statistic representing a measure of randomness of a performance function. Finally, a confidence interval of the performance function is determined.

In the present embodiment, a confidence interval half width of the at least one random variable is used to determine a measure of randomness of the at least one random variable. In other words, a confidence interval half width as one type of statistic representing a measure of randomness of the at least one random variable is determined, and subsequently, the determined confidence interval half width is transformed into a confidence interval half width as one type of statistic representing a measure of randomness of the performance function.

Figure 11:
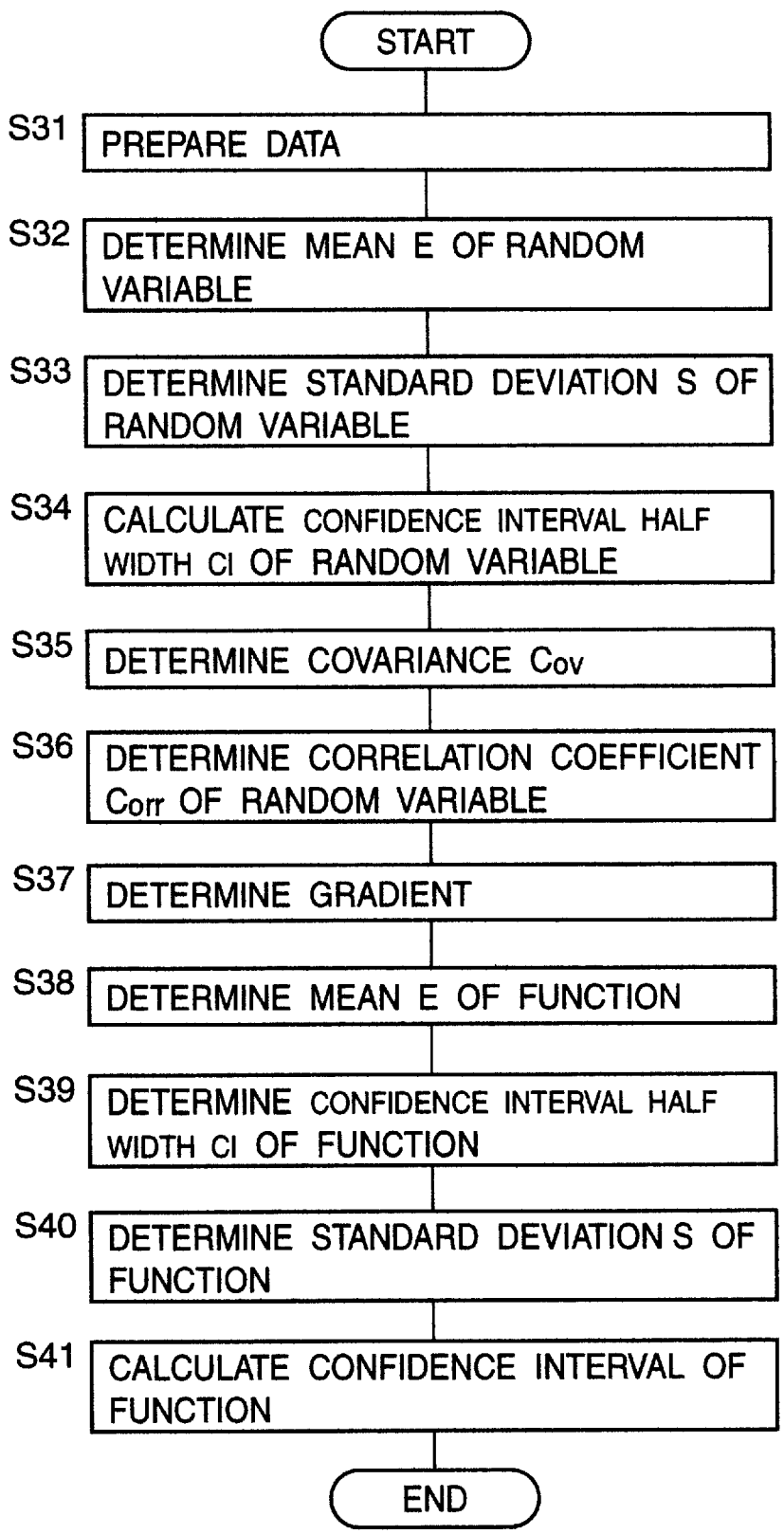
FIG. 11 is a flow chart schematically illustrating a random-variable-function-randomness estimation program executed by a computer to effect a method of estimating a measure of randomness of a function of a random variable according to a second embodiment of the present invention.

Referring next to FIG. 11, there is schematically illustrated by a flow chart the random-variable-function-randomness estimation program mentioned above in the present embodiment.

Steps S31, S32, and S33 of this program are executed in such a manner as in steps S1, S2, and S3 of the corresponding program in the first embodiment.

This program then proceeds to step S34 in which a confidence interval half width is calculated for all the random variables X, Y obtained in step S31. A standard equation as shown as equation (17) in FIG. 10A can be used, using the standard deviation S[X], S[Y] of the random variables X, Y instead of the standard deviation S[Z] of the performance measure Z of the performance function. The confidence interval half width is also a measure of variation of the random variables X, Y. A confidence level a has to be chosen to calculate a confidence interval half width.

Subsequently, in step S35, the covariance Cov[X, Y] of the random variables X, Y is calculated in such a manner as in step S4 of the first embodiment.

Then, in step S36, the correlation coefficient Corr[X, Y] is calculated if more than one random variable is used in the performance function. Here, the performance function is assumed to be a function of two random variables X, Y. The calculation of the correlation coefficient Corr[X, Y] is based on the covariance Cov[X, Y] as determined in step S35, and the standard deviations S[X], S[Y] of the random variables X, Y as determined in step S33. Equation (10) in FIG. 8C shows the functional relation between the correlation coefficient Corr[X, Y], the covariance Cov[X, Y], and the standard deviations S[X], S[Y].

Afterward, in step S37, gradients of the performance function of the means E[X], E[Y] are determined for all the random variables X, Y, at the means E[X], E[Y] determined in step S32, as in such a manner as in step S5 of the first embodiment.

Step S37 is followed by step S38 to determine the mean value E[Z] of the performance function in such a manner as in step S6 of the first embodiment.

Subsequently, in step S39, by the use of the gradients determined in step S37, the confidence interval half width CI of the random variables X, Y directly (i.e., not by way of a standard deviation as one type of statistic) into a confidence interval half width CI of the performance function.

Described more specifically, for one random variable, the above translation can be done easily as shown by equation (18) in FIG. 10B. It is to be note that the square root of the square ensures a positive confidence interval half width CI.

For two random variables, the calculation of the confidence interval half width CI is calculated using equation (19) in FIG. 10C. Equation (19) has a term of the Corr[X, Y]. It is to be noted that if the random variables are independent, the correlation coefficient Corr[X, Y] is zero and the term can be dropped.

Whether the number is the random variable(s) is one or two, the gradient is used in calculating the confidence interval half width CI, as shown by equations (18) and (19) in FIGS. 10B, 10C.

If more than two random variables are used, more complex statistical approaches have to be used.

Subsequently, in step S40, the standard deviation S[Z] of the performance function of the mean in such a manner as in step S8 of the first embodiment.

Following step S40, in step S41, the confidence interval of the performance function is calculated on the basis of the confidence interval half width CI determined in step S39, and the mean value E[Z] determined in step S38. The function to calculate the confidence interval is shown as equation (20) in FIG. 10D.

Then, one cycle of the execution of this program is terminated.

It will be understood from the above explanation that step S31 provides an example of the step of obtaining set forth in the above mode (1), step S32 provides an example of the step of determining the at least one representative value set forth in the same mode, steps S33 and S34 corporate to provide an example of the step of determining a statistic set forth in the same mode, step S37 provides an example of the step of determining a gradient set forth in the same mode, and steps S35, S36, S39, and S41 corporate to provide an example of the step of transforming set forth in the same mode.

[Third Embodiment]

There will next be described a method of estimating a measure of randomness of a function of at least one representative value of at least one random variable, constructed according to a third embodiment of this invention. However, since the third embodiment is similar to the first and second embodiments in a hardware construction for the estimation of the measure of randomness except a software construction for the estimation of the measure of randomness, especially a random-variable-function-randomness estimation program to be executed by a computer corresponding to the computer 20 in the first embodiment, only this program will be described in detail.

The first and second embodiments of the present invention require a standard deviation of at least one random variable, for the estimation of a measure of randomness of a performance function of the at least one random variable.

On the contrary, the presented third embodiment does not use a standard deviation of at least one random variable at all, in order to estimate a measure of randomness of a performance function of the at least one random variable. Rather, the present embodiment creates a tangential equation to the mean of the performance function, and translates a set of a plurality of individual data values belonging to each random variable, into a set of individual data values representing the performance function, using the created tangential equation.

Summing up, the present embodiment determines a set of a plurality of individual data values of each random variable, as a statistic representing a measure of randomness of the performance function of the random variables.

Figure 12:
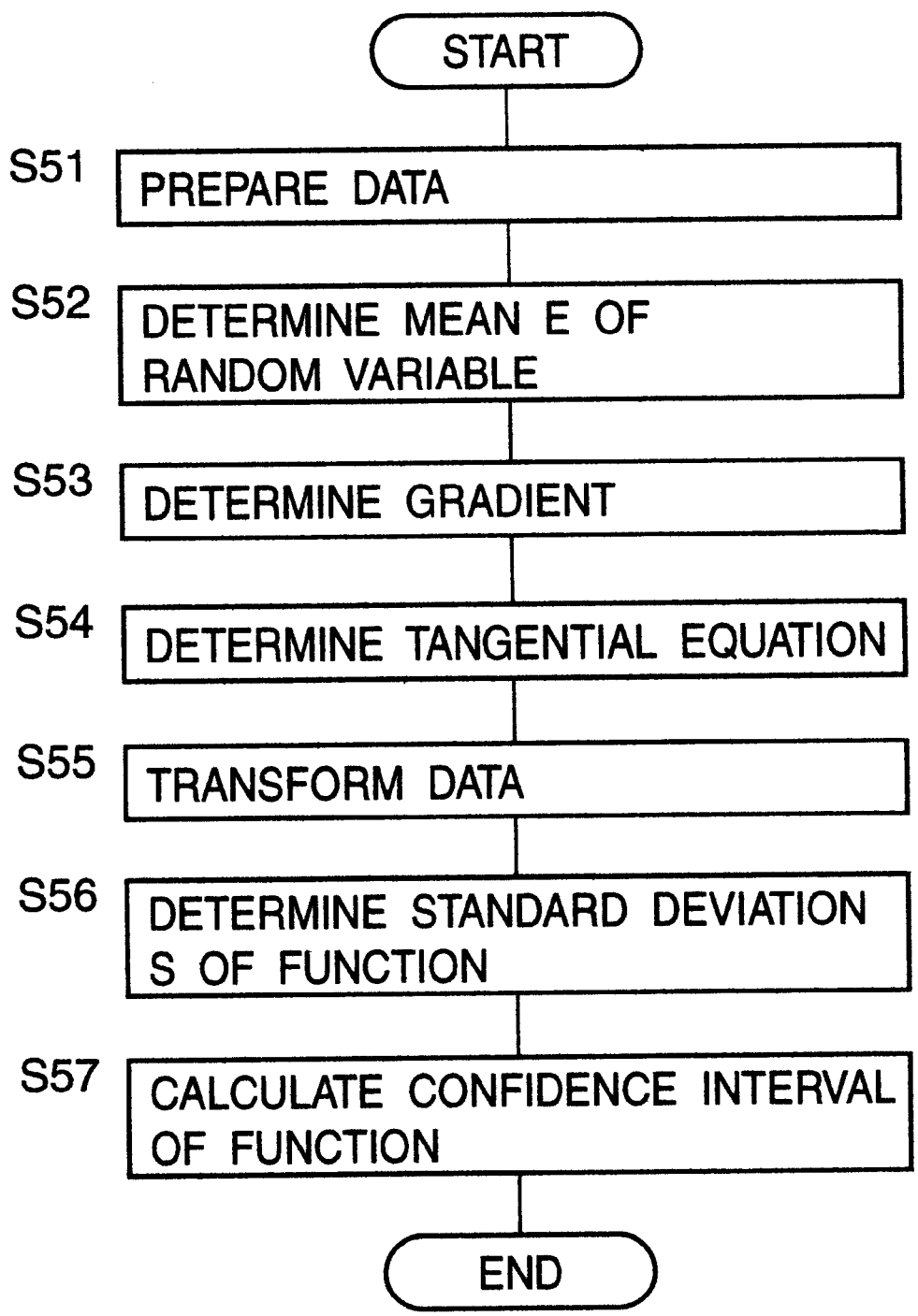
FIG. 12 is a flow chart schematically illustrating a random-variable-function-randomness estimation program executed by a computer to effect a method of estimating a measure of randomness of a function of a random variable according to a third embodiment of the present invention.

Referring next to FIG. 12, there is schematically illustrated by a flow chart the random-variable-function-randomness estimation program mentioned above in the present embodiment.

Steps S51, S52, and S53 of this program are executed in such a manner as in steps S1, S2, and S5 of the first embodiment of the present invention.

These steps of this program is followed by step S54 in which a tangential equation is determined on the basis of the means of the random variables, and the gradient of the performance function.

The number of dimensions of the tangential equation equals the number of the random variables. Described more specifically, if one random variable is used, the tangential equation defines a line. If two random variables are used, the tangential equation defines a plane. Similar tangents can be constructed for higher order dimensions of the tangential equation, although the visualization is difficult. A general tangential equation f' for one random variable is shown as equation (21) in FIG. 13A, while a general tangential equation f' is shown as equation (22) in FIG. 13B.

Subsequently, in step S55, the sets of individual data values for all the random variables are entered in the tangential equation determined in step S54. The entry produces a set of data values Z' for the performance function of the mean values, on the basis of the individual data values x, y of the random variables X, Y The tangential equation is shown as equation (23) in FIG. 13C.

Step S55 is followed by step S56 in which a standard deviation is calculated for the set of data values Z' of the performance function. By definition, the mean of the set of data values Z' equals the performance function of the mean values of the random variables. The standard deviation is calculated using equation (6) or (7) in FIG. 4F or 4G for the unbiased or the maximum likelihood estimator.

Afterward, in step S57, a confidence interval is calculated on the basis of the standard deviation of the set of data values Z', and the number of individual data values in the data set Z'. The calculation is done using a standard equation as shown as equation (17) in FIG. 10A to calculate the confidence interval half width, and equation (20) in FIG. 10D to calculate the confidence interval.

It is important to note that, in this embodiment, a complete set of individual data values is available for the performance function of the means, allowing the use of more complex and sophisticated approach to determine the confidence interval. For example, it is possible to take the shape of the distribution of the individual data values into account to obtain different confidence interval half widths for regions above and below the mean of the performance function.

It will be understood from the above explanation that step S51 provides an example of the step of obtaining set forth in the above mode (1), and an example of the step of determining a statistic set forth in the same mode, step S52 provides an example of the step of determining the at least one representative value set forth in the same mode, step S53 provides an example of the step of determining a gradient set forth in the same mode, and steps S54 to S57 corporate to provide an example of the step of transforming set forth in the same mode.

It will be also understood from the above explanation that step S51 provides an example of the step of obtaining set forth in the above mode (15), step S52 provides an example of the step of determining the representative value set forth in the same mode, step S53 provides an example of the step of determining a gradient set forth in the same mode, and steps S54 and S55 corporate to provide an example of the step of transforming set forth in the same mode.

While the present invention has been described in detail in its presently preferred embodiments, these embodiments would provide the following advantageous results optionally or collectively:

(a) these embodiments allow the calculation of a measure of randomness of the function of means of the random variables even for data sets of a relatively small size (e.g., the minimum size is two and the recommended size is at least five);

(b) these embodiments allow the calculation of a measure of randomness of the function of the means with greatly improved accuracy over the conventional batching method previously mentioned;

(c) these embodiments allow the calculation of a measure of randomness of the function of the means with less effort than the conventional batching method;

(d) these embodiments calculate an updated measure of randomness of the function of the means with minimal effort if new data becomes available;

(e) these embodiments allow the calculation of a measure of randomness of the function of the means with a minimal need for storage and computational power;

(f) the ease of implementing the preferred embodiments mentioned above into an automated software program when compared with the previous batching method, allowing for a simple and reliable calculation of the validity of the results of a set of data obtained from a software simulation, for example;

(g) with respect to discrete event simulation, a single simulation will suffice to calculate a confidence interval, whereas the previous batching method requires multiple simulations or a long simulation split into multiple batches, thus saving simulation time and allowing the comparison of more simulations within a given time;

(h) with respect to discrete event simulation, a confidence interval can be calculated even if there exists only a small number of individual data values, for example, in the case of rare events, the validity of the results of computational analysis can be determined for a shorter simulation; and (i) with respect to discrete event simulation, due to the small computation and storage requirements mentioned above, it is possible to calculate a confidence interval which updates as the simulation progresses, i.e., it is possible to monitor the reduction of the confidence interval width as the simulation progresses, where the information can be used for example to determine when a certain required accuracy is reached and the simulation can be stopped.

It is to be added that the aforementioned embodiments of the present invention may be practiced in such form to calculate the confidence interval, and to use the calculated confidence interval for automatically updating the confidence interval during the progress of the simulation. In the form, it is possible to calculate the mean, the standard deviation, and the correlation on the basis of sums of individual data values. Subsequently, if additional individual data becomes available, those sums have to be merely updated to create a new value of the confidence interval. Therefore, it is possible to calculate the confidence intervals as the simulation progresses, with little or no effort.

The above form of the preferred embodiments also allows an automated simulation termination according to a required confidence level. During the creation of the simulation model, the desired confidence interval half widths of one or more simulation parameters are specified. During the simulation, the confidence interval half widths of these simulation parameters are continuously updated. If the actual or updated confidence interval half widths are equal to or less than the desired confidence interval half widths for all the simulation parameters, the simulation is terminated.

The above form of the preferred embodiments would solve a big problem of current simulation methodologies, where the exact time length of a simulation is difficult to determine. This form would allow an automatic termination of the simulation upon reaching a predefined accuracy criterion on results of the simulation.

It is to be also added that, in general, to calculate a confidence interval using the conventional batching method requires at least 5, generally 10 to 30 simulations. The preferred embodiments mentioned above allow the calculation of a confidence interval for a function of at least one mean, using only one simulation.

It is to be further added that, the preferred embodiments mentioned above allow the calculation of confidence intervals for a small set of individual data values, for example, a set of only 10 individual data values. The conventional batching method cannot calculate a remotely valid confidence interval for such a small set of individual data values.

It is to be still further added that, the preferred embodiments mentioned above allow the calculation of a confidence interval with almost the same range with the case where the conventional batching method calculates the confidence interval on the basis of a large set of individual data values during multiple simulations, although the preferred embodiments calculate the confidence interval on the basis of a small set of individual data values during one simulation.

There may exist the case where information regarding a distribution of random variables is not available as a set of data, but rather available as a probability density function. In this case, the preferred embodiment of the present invention described above would have to be modified to determine the mean and deviation based on the probability density function.

[Fourth Embodiment]

There will next be described a method of estimating a measure of randomness of at least one random variable to satisfy a predetermined condition regarding a measure of randomness of a function of a representative value of the at least one random variable, constructed according to a fourth embodiment of this invention. However, since the fourth embodiment is similar to the previous three embodiments in a hardware construction for the estimation of the measure of a randomness except a software construction for the estimation of the measure of randomness, especially a random-variable-randomness estimation program to be executed by a computer corresponding to the computer 20 in the first embodiment, only this program will be described in detail.

It is possible to mutually associate a measure of randomness of at least one random variable, and a measure of randomness of a function of a representative value of the at least one random variable. This means that, the use of a gradient of the function would permit not only a forward estimation to estimate a measure of randomness of the function of the representative value of the at least one random variable, from a measure of randomness of the at least one random variable, but also a backward estimation to estimate a measure of randomness of the at least one random variable, from a measure of randomness of the function of the representative value of the at least one random variable.

In addition, it may be of use not to calculate a measure of randomness of a function of a mean based on random variables, but to reverse the equations described above and to obtain desired statistical properties of random variables which would be needed to obtain a certain measure of randomness of the function.

While the previous three embodiments of the present invention perform the forward estimation mentioned above, the presented fourth embodiment performs the backward estimation also mentioned above.

In the fourth embodiment, the predetermined condition with respect to the randomness of the performance function has been formulated to define a central location and a measure of dispersion, of a distribution of the performance function.

Figure 14:
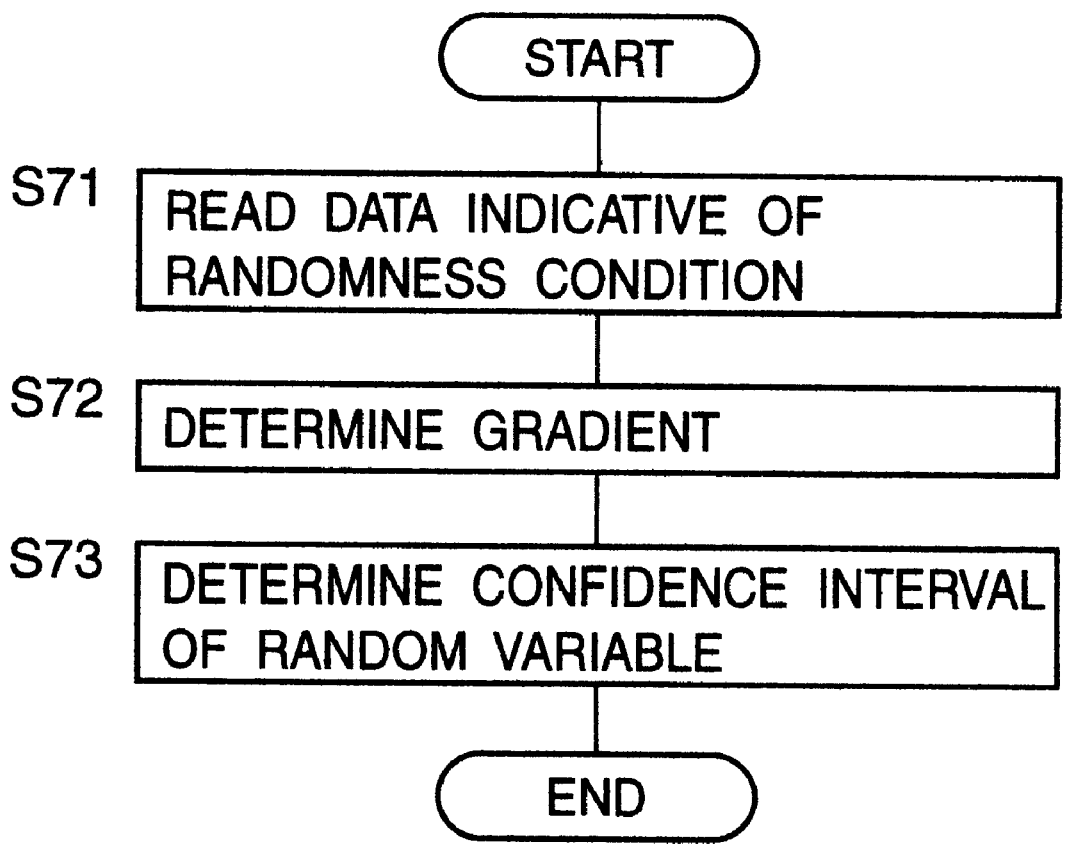
FIG. 14 is a flow chart schematically illustrating a random-variable-randomness estimation program executed by a computer to effect a method of estimating a measure of randomness of a random variable according to a fourth embodiment of the present invention.

Referring next to FIG. 14, there is schematically illustrated the aforementioned random-variable-randomness estimation program in the present embodiment.

This program is initiated with step S71 in which data for the predetermined condition is read from the storage 14. The data has been stored therein.

In step S72, a gradient of the performance function with respect to the defined central location is determined by using the equation shown as for example equation (2), (3) or (4) in FIG. 4.

In step S73, a confidence interval as a measure of randomness of the at least one random variable is determined on the basis of the determined gradient and the defined measure of dispersion. The determination is to transform the defined measure of dispersion into the confidence interval of the at least one random variable, such that the confidence interval responds to the defined measure of dispersion more sensitively in the case of the gradient being steep than in the case of the gradient being gentle.

Then, one cycle of execution of this program is terminated.

It will be understood from the above explanation that step S72 provides an example of the step of determining a gradient set forth in the above mode (21), and step S73 provides an example of the step of determining the measure of randomness set forth in the same mode.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of estimating a measure of randomness of a function of at least one representative value of at least one random variable, a plurality of individual data values of which are randomly distributed, the method comprising:

a step of obtaining the at least one random variable;

a step of determining the at least one representative value of the obtained at least one random variable, using a computer;

a step of determining a statistic of the obtained at least one random variable, using the computer;

a step of determining a gradient of the function with respect to the determined at least one representative value, using the computer; and a step of estimating the measure of randomness of the function, wherein the step of estimating includes transforming by the computer the obtained statistic of the at least one random variable into a statistic of the function, using the determined gradient.

2. The method according to claim 1, further comprising a step of estimating the measure of randomness of the function of the at least one representative value, on the basis of the statistic of the function.

3. The method according to claim 2, applied to a simulation for discrete event, results of which simulation is used to effect the method, wherein the step of estimating comprises estimating the measure of randomness using results of only one execution of the simulation.

4. The method according to claim 3 wherein an accuracy to be satisfied with the statistic of the function is predetermined, and the step of determining a statistic comprises:

(a) determining the statistic of the at least one random variable, on the basis of a sum of individual data values belonging to the at least one random variable;

(b) determining the statistic of the at least one random variable on the basis of the sum, upon adding to the sum at least one new individual data value belonging to the at least one random variable;

(c) determining the statistic of the at least one random variable when at least one new individual data belonging to the at least one random variable becomes available during the simulation;

(d) transforming the determined statistic of the at least one random variable into the statistic of the function; and (e) terminating the simulation when the predetermined accuracy is satisfied with the statistic of the function.

5. The method according to claim 2 wherein the measure of randomness comprises a range of a confidence interval of the function of the at least one representative value.

6. The method according to claim 1, wherein the function is a function of a plurality of random variables, the step of transforming comprising:

(a) determining a measure of randomness of each one of the plurality of random variables at or in the vicinity of a representative value of each one of the obtained plurality of random variables, as the statistic of each random variable;

(b) determining a measure of dependence between the plurality of random variables; and (c) transforming the determined measures of randomness of the plurality of random variables into a measure of randomness of the function, using the determined measure of dependence and the determined gradient.

7. The method according to claim 6, wherein the measure of randomness of the each random variables comprises at least one of a maximum likelihood estimator of a variance of the each random variable, an unbiased estimator of the variance, a maximum likelihood estimator of a standard deviation of the each random variables, an unbiased estimator of the standard deviation, a variance of a representative values of the each random variable, a standard deviation of a representative value of the each random variable, a coefficient of variation of the each random variable, a general central moment of the each random variable, a confidence interval of the each random variable, a set of data indicative of the each random variable, a probability density function of the each random variable, and a cumulative density function of the each random variable.

8. The method according to claim 6, wherein the measure of dependence comprises at least one of an unbiased estimator of a covariance of the plurality of random variables, a maximum likelihood estimator of the covariance, and a correlation coefficient of the plurality of random variables.

9. A computer program to be executed by a computer to effect the method according to claim 1.

10. A computer-readable storage medium having stored therein the computer program according to claim 9.

11. The method according to claim 1, wherein the step of transforming comprises transforming the statistic of the at least one random variable into the statistic of the function, such that the statistic of the function responds to the statistic of the at least one random variable more sensitively in the case of the gradient being steep than in the case of the gradient being gentle.

12. The method according to claim 1, wherein each one of the representative value of the each random variable comprises at least one of an average, an arithmetic mean, a geometric mean, a median, a harmonic mean, and a mode, of each one of the at least one random variable.

13. The method according to claim 1, wherein the step of determining the representative value comprises determining the at least one representative value of the at least one random variable upon truncating at least one part of individual data values belonging to the at least one random variable.

14. The method according to claim 1, wherein the statistic of each one of the at least one random variable comprises at least one of a standard deviation, a confidence interval, a set of data, a probability density function, and a cumulative density function, of the each random variable.

15. The method according to claim 1, wherein the statistic of the function comprises at least one of a standard deviation, a confidence interval, a set of data, a probability density function, and a cumulative density function, of the function.

16. The method according to claim 1, wherein the function is a function of a plurality of random variables, the step of transforming comprises transforming the obtained statistic of the plurality of random variables into the statistic of the function, without a calculation of a measure of dependence between the plurality of random variables.

17. The method according to claim 1, applied to an analysis of a plurality of business models to be accepted in realizing a given business, wherein a function of at least one of random variable is predetermined for each one of the plurality of business models, and the function of a representative value of the each random variable for one of the plurality of business models is to be compared with the function of a representative value of the each random variable for another of the plurality of business models.

18. The method according to claim 1, wherein the at least one random variable represents a state of a machine in a manufacturing machine.

19. A method of determining a set of data of a function of a representative value of each one of at least one random variable, which set of data allows an evaluation of a statistic of the function, wherein a plurality of individual data values of the at least one random variable are randomly distributed, the method comprising:

a step of obtaining a set of individual data values belonging to each random variable, which set represents an approximation of a distribution of the each random variable;

a step of determining the representative value of the each random variable, using a computer;

a step of determining a gradient of the function with respect to the determined representative value, using the computer; and a step of transforming the obtained set of individual data values into the set of data representing the function, using the computer.

20. The method according to claim 19, further comprising a step of estimating a measure of randomness of the function of the representative value, on the basis of the set of data representing the function.

21. The method according to claim 20, wherein the measure of randomness comprises a range of a confidence interval of the function of the representative value.

22. The method according to claim 20, applied to a simulation for discrete event, results of which simulation is used to effect the method, wherein the step of estimating comprises estimating the measure of randomness using results of only one execution of the simulation.

23. The method according to claim 19 wherein the step of transforming the set of individual data values of the each random variable into the set of data representing the function, such that the set of data representing the function responds to the set of individual data values more sensitively in the case of the gradient being steep than in the case of the gradient being gentle.

24. The method according to claim 19, wherein the at least one random variable represents a state of a machine in a manufacturing machine.

25. A method of estimating a measure of randomness of at least one random variable to satisfy a predetermined condition regarding a measure of randomness of a function of at least one representative value of the at least one random variable, wherein a plurality of individual data values of the at least one random variable are randomly distributed, and wherein the predetermined condition is formulated to define a central location and a measure of dispersion, of a distribution of the function, the method comprising:

a step of determining a gradient of the function with respect to the defined central location, using a computer; and a step of estimating the measure of randomness of the function, wherein the step of estimating includes determining the measure of randomness of the at least one random variable, on the basis of the determined gradient and the defined measure of dispersion, using the computer.

26. The method according to claim 25, wherein the step of determining the measure comprises transforming the defined measure of dispersion into the measure of randomness of the at least one random variable, such that the measure of randomness of the at least one random variable responds to the defined measure of dispersion more sensitively in the case of the gradient being steep than in the case of the gradient being gentle.

27. The method according to claim 25, wherein the measure of dispersion comprises at least one of a standard deviation, a confidence interval, a set of data, a probability density function, and a cumulative density function, of the function.

28. The method according to claim 25, wherein the measure of randomness of each one of the at least one random variable comprises at least one of a standard deviation, a confidence interval, a set of data, a probability density function, and a cumulative density function, of the each random variable.

29. The method according to claim 25, wherein the at least one random variable represents a state of a machine in a manufacturing machine.

* * * * *